us005502309A

United States Patent [19]

Davis

[11] Patent Number: 5,502,309
[45] Date of Patent: Mar. 26, 1996

[54] STARING SENSOR

[75] Inventor: John E. Davis, Claremont, Calif.

[73] Assignee: Rockwell International Corporation, Seal Beach, Calif.

[21] Appl. No.: 300,763

[22] Filed: Sep. 6, 1994

[51] Int. Cl.$^6$ .................. G02B 13/06; G02B 17/00
[52] U.S. Cl. .................. 250/353; 250/332; 250/352; 359/742
[58] Field of Search .................. 250/332, 334, 250/352, 353; 359/725

[56] References Cited

U.S. PATENT DOCUMENTS

| | | |
|---|---|---|
| 1,797,867 | 3/1931 | Karnes . |
| 1,959,702 | 5/1934 | Barker . |
| 2,244,235 | 6/1941 | Ayres . |
| 2,638,033 | 5/1953 | Buchele et al. . |
| 2,923,220 | 2/1960 | Bouwers . |
| 3,151,524 | 10/1964 | Bouwers . |
| 3,283,653 | 11/1966 | Tokarzewski . |
| 3,514,186 | 5/1970 | Poncelet . |
| 3,781,559 | 12/1973 | Cooper et al. .................. 250/334 |
| 3,894,798 | 7/1975 | Wolf . |
| 3,977,793 | 8/1976 | Trotta .................. 250/347 X |
| 3,998,532 | 12/1976 | Dykes . |
| 4,012,126 | 3/1977 | Rosendahl et al. .................. 359/725 |
| 4,446,372 | 5/1984 | Gurnee .................. 250/334 |
| 4,463,357 | 7/1984 | MacDoran .................. 343/460 |
| 4,566,763 | 1/1986 | Greguss . |
| 4,567,367 | 1/1986 | Brown de Colstoun et al. .................. 250/340 |
| 4,977,323 | 12/1990 | Jehle .................. 250/332 |
| 4,994,670 | 2/1991 | Noble et al. .................. 250/334 X |
| 5,049,756 | 9/1991 | Brown de Colstoun et al. .................. 254/554 |
| 5,160,842 | 11/1992 | Johnson .................. 250/338.1 |
| 5,218,345 | 6/1993 | Muller et al. .................. 340/578 |
| 5,281,815 | 1/1994 | Even-Tov .................. 250/339 |
| 5,402,168 | 3/1995 | Fouilloy .................. 348/164 |

FOREIGN PATENT DOCUMENTS

| | | | |
|---|---|---|---|
| 878162 | 8/1971 | Canada .................. 359/725 |
| 2-22522 | 1/1990 | Japan .................. 250/353 |

*Primary Examiner*—Carolyn E. Fields
*Assistant Examiner*—Edward J. Glick
*Attorney, Agent, or Firm*—Lawrence N. Ginsberg; Charles T. Silberberg

[57] ABSTRACT

A staring sensor apparatus which includes an optics assembly for providing a panoramic field of view in which the field of view in one direction is considerably larger than the field of view in the direction perpendicular thereto. A two-dimensional focal plane assembly (FPA) collects and converts an incoming optical signal from the optics assembly to an electrical wave form which depicts the energy falling on each pixel of the FPA in a discrete unit of time. The resulting pixel outputs thus represent the energy emitted from specific calibratable around the optics assembly.

5 Claims, 2 Drawing Sheets

STARING SENSOR

BACKGROUND OF THE INVENTION

1. Field of the Invention

This invention relates to electro-optical sensor systems and, more particularly, to a staring sensor apparatus capable of simultaneously covering up to 360° azimuthal field of regard.

2. Description of the Related Art

Optical sensors are easier to design when the field of view is narrow. Wide field sensors have greater aberration problems, including coma, chromatic aberrations, and non flat focal planes. Some approaches to wide angle sensors include designs which preclude the use of normal flat focal plane arrays (FPAs). To mitigate these problems, scanning sensors are often used to cover wide fields using narrow field optics. Scanning systems sensitivity is generally low compared to staring system sensitivity. This causes the designer to sacrifice dwell time and revisit time desires. The requirements for sensitivity are then met by using larger and larger optics. The resulting systems are heavier and more costly.

When fields of regard approach and exceed 180° using conventional optics, the optical system is often called a "fish eye" or "all sky" lens. This concept uses a family of lenses generically related in that they provide a wide angle of coverage around a hemisphere orthogonal to the prime axis.

The wide field sensors in the class pertinent to this patent application are generally designed to observe a cylinder whose sides are parallel to the prime axis of the optics. The present invention could be considered to fall within a subclass within this class, i.e. panoramic lenses. The valid elevation angle of the optics is constrained to be close to the horizon. The view directly in front of the optics is obscured. The problem with current optical systems providing panoramic views is that designers have been unable to combine this toroidal view, a conventional FPA, and a staring sensor. For a large set of applications, this "staring sensor" type is the best option from the standpoint of size, weight, sensitivity, and cost.

SUMMARY OF THE INVENTION

The present invention is a staring sensor apparatus which includes an optics assembly for providing a panoramic field of view in which the field of view in one direction is considerably larger than the field of view in the direction perpendicular thereto. A two-dimensional focal plane assembly (FPA) collects and converts an incoming optical signal from the optics assembly to an electrical wave form which depicts the energy falling on each pixel of the FPA in a discrete unit of time. The resulting pixel outputs thus represent the energy emitted from specific calibratable regions around the optics assembly.

In one embodiment, a cooler is provided for keeping the FPA at a desired operating temperature. An evacuated dewar isolates the FPA and the cooler from ambient conditions.

The approach of the present invention meets the requirements for an adjustable elevation angle above, below, and spanning the horizon. A flat focal plane and image plane are provided. The effective aperture is sufficiently large to provide high sensitivity through aggregation of FPA frames. Off axis rejection of energy is provided by using a radial comb to limit the instantaneous field of view of the individual detectors. This comb is placed in collimated space outside of the last powered optical surface but inside the final environmental shield.

Elevation angles desired are provided using variations of the final elements of the optical design. The flat mirror concept is excellent for angles from about 5 degrees below the horizon to about 40 degrees below the horizon. It is also useful for a vertical field of regard in a range from about +20° to −20° from the horizon. The reason that this configuration is useful rather than the simpler configuration with no mirror is that the other configuration has poorer resolution close to the horizon and better resolution as the elevation angle departs from the horizon. The other configuration results in a major variation in resolution as the elevation angle changes, thus creating a major degradation in sensitivity as range increases with elevation angle. The preferred version can have much smaller resolution changes with the changes in range and elevation angle.

The sensor can be inverted and the world viewed above the horizon with the same benign attributes mentioned above.

If the intent is to observe a band encompassing the horizon, two representative alternatives have been identified out of the total family of concepts embodied by the principles of this invention. The first includes a concentric ring lens which begins the bend of the optical rays toward the more conventional lens set. By changing this last lens, lens set, or lenses, the band of elevation angles can be field modified to cover areas above, at, or below the horizon. This modification could be literally screwed onto an optical base which contains the rest of the optical elements.

Another approach to this class of sensors would include a convex resolution bowl which forms the first powered optical surface. The magnitude of the azimuthal and elevation decollimation would be about the same. The following lens sets would take the divergent rays and focus them on the FPA by the same approach as shown in the above embodiments.

BRIEF DESCRIPTION OF THE DRAWINGS

The same elements or parts throughout the figures are designated by the same reference characters.

DETAILED DESCRIPTION OF THE PREFERRED EMBODIMENTS

Figure 1:
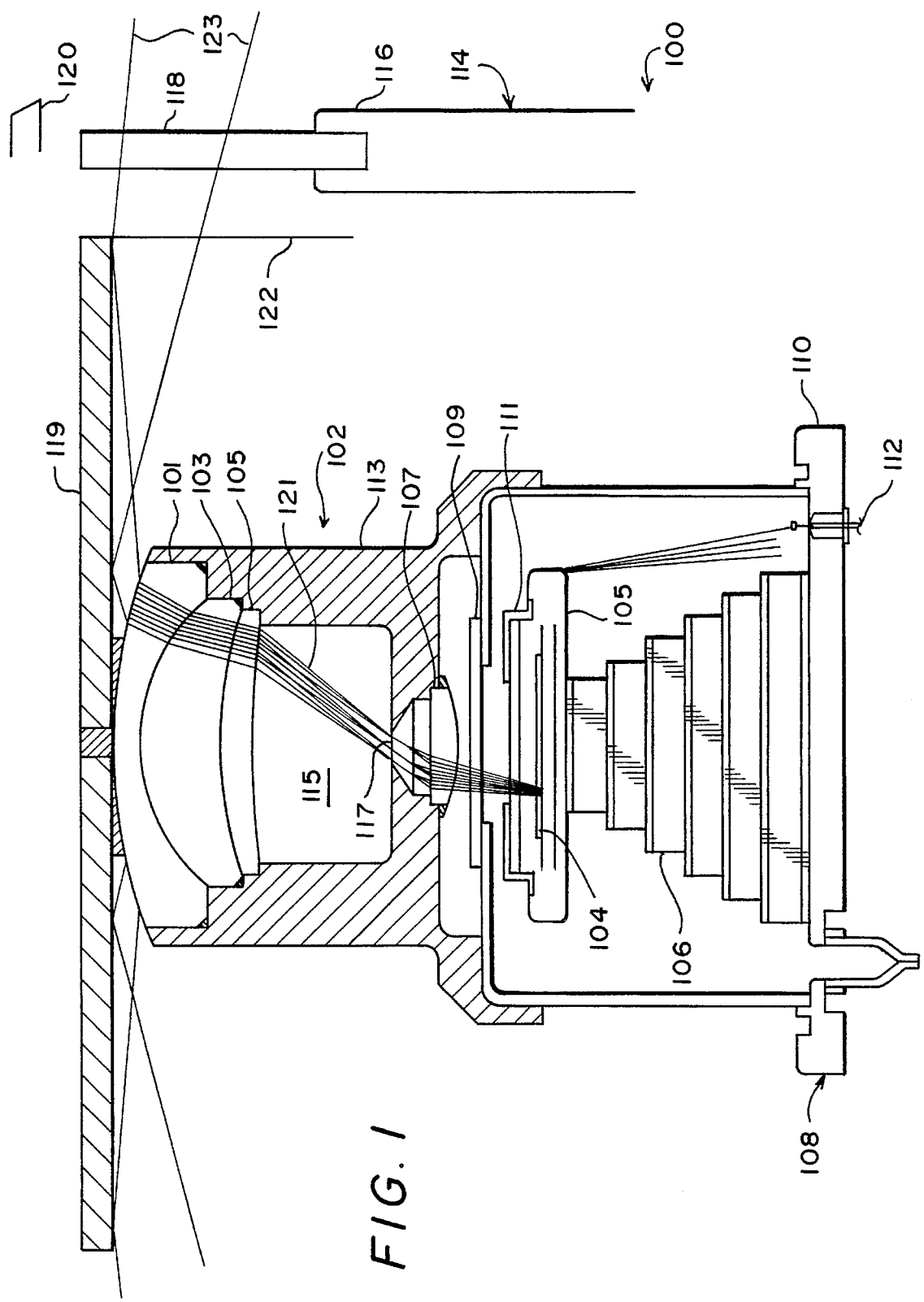
FIG. 1 is a side, cross sectional view of a preferred embodiment of the present invention which utilizes a flat mirror.

Referring now to the drawings and to the characters of reference marked thereon, FIG. 1 illustrates a preferred embodiment of the staring sensor apparatus of the present invention designated generally as 100. Staring sensor apparatus 100 is of a type that utilizes a flat mirror and a thermo-electric cooler. Staring sensor 100 includes an optics assembly, designated generally as 102 for providing up to 360° azimuthal field of regard with a vertical field of regard near the horizon. A two-dimensional focal plane array (FPA) 104 collects and converts an incoming optical signature from the optics assembly 102 to an electrical wave form. The focal plane 104 is mounted on a focal plane mount 105. The electrical form depicts the discrete energy falling on each pixel of the FPA 104 in a discrete unit of time. A cooler 106 is provided for keeping the FPA 104 at a desired operating temperature. The cooler 106 is of a thermo-electrical (TE) type. The size of the array is preferably in a range of 256×256 pixels to 1024×1024 pixels. If a visible array FPA is desired, it may be of the so called array type. Options for implementation of the FPA include normal square pixels or a set concentric rings which are mapped back into a square array.

The optics assembly 102 includes transmissive elements 101, 103, 105 and 107. These transmissive elements or lenses combine to create a flat focal plane which images on the FPA 104. Additional transmissive element 109 is used to close out the pressure vessel dewar 108. The evacuated dewar 108 is provided for isolating the FPA 104 and the cooler 106 from ambient conditions.

A band pass filter 111 is used to limit the total energy spectrally, which is allowed to fall on FPA 104. The dewar window 109 and filter 111 are not powered optical elements. Transmissive elements 101, 103, 105 and 107 are powered optical elements. All of the transmissive elements are positioned laterally and axially by the optical spacing structure 113. Cavity 115 provides the desired optical spacing. A limiting aperture 117 is formed in the structure 113 for limiting off-axis energy and providing a stop.

A band mirror 119 is mounted orthogonal to the prime axis of the sensor. The edge rays 121 of the optical path are coming in from the right, as shown at numeral designation 123. These rays reflect off of the mirror 119 at close to a grazing angle and are reflected through the powered optical elements 101, 103, 105, through the aperture 117, through the powered element 107, through the close out window 109, through the filter of 111, and finally strike the FPA 104. The implementation of this optical path causes rays closest to the horizon to fall farthest out on FPA 104. The rays farthest from the horizon fall in a smaller circle on FPA 104.

A heat sink 110 and electrical connections 112 are included for interfacing electrical and mechanical connections of the sensor apparatus 100 to a mounting post. A housing 114 includes a frame 116, a cylindrical window 118 and a roof 120 for protecting the sensor from the elements. Included inside of housing 114 is a cylindrical field limiter 122 to minimize the problems of off-axis radiation.

Figure 2:
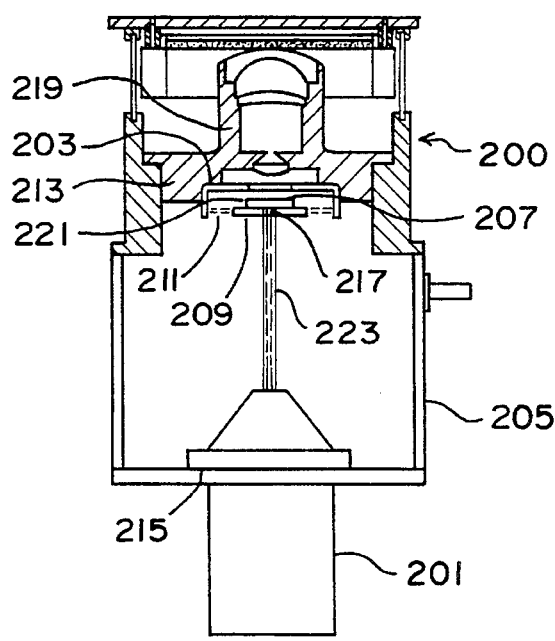
FIG. 2 is a side, cross sectional view of an embodiment of the present invention which utilizes a flat mirror and a mechanical cooler.

FIG. 2 illustrates a second embodiment of the staring sensor apparatus of the present invention, designated generally as 200. This staring sensor apparatus 200 is cooled by a mechanical cryo cooler 201. Most of the basic features of the FIG. 1 embodiment are the same as in the FIG. 2 embodiment with the exception of the cryo cooler 201 which replaces the TE cooler 106 of FIG. 1. In order to implement the modification of the dewar 108 and focal plane mount 105, the size and shape of the dewar 108 is expanded to provide an appropriate vacuum sealed interface 203 from the dewar 205 to the cooler 201. Additionally, the filter 207, focal plane mount 209, and thermal isolator 211 are attached to the optics housing 213. A vacuum seal 215 is provided between the cooler 201 and the dewar 205. The alignment and focus of the focal plane assembly 217 are assured by the short mechanical path between the focal plane 217 and the optics assembly 219. A partial cold shield 221 is provided around the focal plane 217 to improve performance. The connection between the cryo cooler and the focal plane mount is provided using a flexible strap 223.

Figure 3:
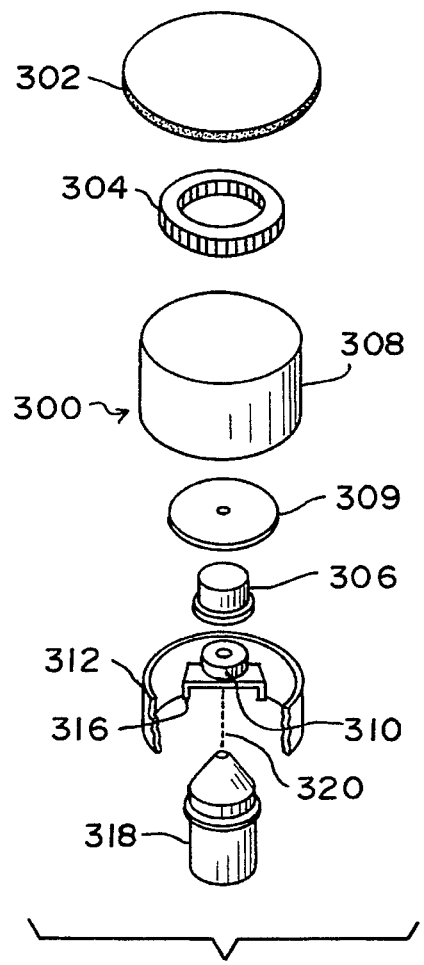
FIG. 3 is an exploded perspective view of the sensor of FIG. 2.

FIG. 3 illustrates an exploded view 300 of the embodiment described in FIG. 2. The salient features of this drawing include the cover 302 to act as an environmental shield, the baffle 304 mounted under the cover to limit the off axis radiation penetrating the optical system 306, the shield 308 which allows the energy from the scene to penetrate to the optics but blocks out the external environment including salt spray, rain, smog, etc., the mirror 308 which acts as the first optical element in the sensor, the wide field lens set 306 which performs the transformation of the incoming energy to a planer wave form at the focal plane 310, the dewar 312 which allows the operation of the focal plane 310 in a cooled environment, the window on the dewar 314 which passes the optical signal but allows the interior of the dewar to be evacuated, the focal plane mount 316 which isolates the focal plane 310 thermally from the walls of the dewar 312 and yet holds the focal plane 310 precisely at the optical focus of the lens set 306, the dewar 312 which is a vacuum housing capable of being evacuated and will retain vacuum for extended periods without maintenance, the cryo cooler 318 which produces cryogenic temperatures for the focal plane 310, and the cold strap 320 which provides mechanical isolation to the focal plane 310 from the cryo cooler 318 and yet conducts the heat away from the focal plane 310.

Figure 4:
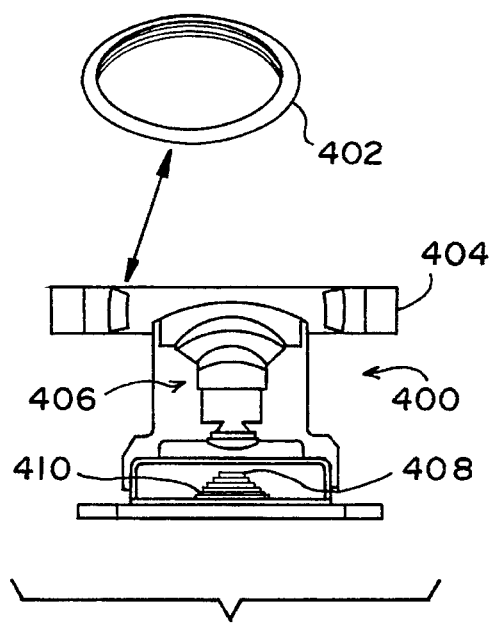
FIG. 4 is a side, cross sectional view of an embodiment of the present invention which utilizes an optics assembly having a toroidal lens (instead of the flat mirror utilized in the previous embodiments).

FIG. 4 illustrates an embodiment wherein the first folding surface of the optics, designated 119 in FIG. 1, is replaced by a transmissive element 402. This approach provides a view of the scene which passes through the horizon. The sensor is comprised of the ancillary parts shown in the previous figures, a baffle 404 to limit the off axis radiation, a toroidal lens 402 to provide a first powered optical element, which is followed by a set of lenses 406 providing a wide field group for transforming the radial incoming scene to a planer wave form at the focal plane 408. The remainder of the figure replicates portions of the other figures in this application. ATE cooler 410 is incorporated, as in FIG. 1.

Figure 5:
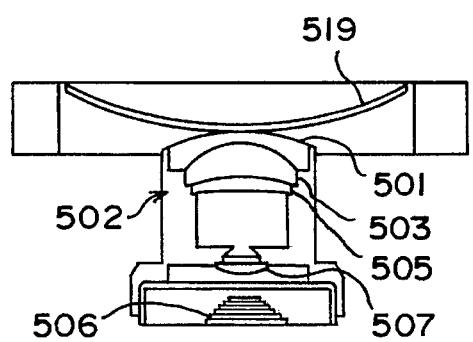
FIG. 5 is a side cross sectional view of an alternate embodiment which utilizes an optics assembly having a rotationally symmetric mirror.

FIG. 5 illustrates a third embodiment of the staring sensor apparatus of the present invention, designated generally as 500. This staring sensor apparatus is cooled by a TE cooler 506 but possesses a modified optical assembly 502. All other portions of the figure remain the same as in FIG. 1. The optics assembly is composed of elements 501, 503, 505 and 507, which are functionally very similar to their counterparts in FIG. 1. The differences in optical form are caused by the different convex mirror 519, which replaces the flat mirror 119 of FIG. 1. This variation in the design allows the sensor to observe a panorama, including scene elements both above and below the horizon.

This embodiment of the concept will have more resolution on one side of the horizon that the other. Since the sensor can be inverted (or the optics can be redesigned appropriately to cause the rays to fall on the near side of the FPA), the improved resolution can be placed either above or below the horizon.

Given that the optics can be tailored to change the amount of elevation coverage above or below the horizon, one embodiment of these concepts includes the feature of replaceable front elements to allow field modifications of the coverage angles. By creating a separation plane below the limit of the clear aperture of the environmental enclosure, the top of the optics can be removed in the field. This feature can allow the sensor installer to modify the elevation field angle for a specific field location as desired by the user. Thus one basic sensor design could be used for multiple installations with the observed regions tailored to the specific installation.

Obviously, many modifications and variations of the present invention are possible in light of the above teachings. It is, therefore, to be understood that, within the scope of the appended claims, the invention may be practiced otherwise than as specifically described.

What is claimed and desired to be secured by Letters Patent of the United States is:

1. A staring sensor apparatus, comprising:
    an optics assembly comprising:
        a convex mirror for receiving light from a panoramic field of view in which the field of view in one direction is considerably larger than the field of view in the direction perpendicular thereto; and
        a plurality of transmissive elements for receiving light substantially solely from said convex mirror, said convex minor and said transmissive elements each providing substantially a 360° azimuthal field of regard; and,
    a two-dimensional focal plane assembly (FPA) for collecting and convening an incoming optical signal from said optics assembly to an electrical waveform which depicts the energy falling on each pixel of said FPA in a discrete unit of time, pixel outputs thereof thus representing the energy emitted from specific calibratable regions around said optics assembly.

2. The apparatus of claim 1, wherein said optics provide a vertical field of regard in a range from about −5° to about −40° from the horizon.

3. The apparatus of claim 1, wherein said optics provide a vertical field of regard in a range from about +20° to −20° from the horizon.

4. The apparatus of claim 1, wherein said optics provide a field modifiable vertical field of regard covering in a range from about −20° to +20° from the horizon and which can be changed by substituting one final lens configuration for another.

5. The apparatus of claim 1, further comprising:
    a cooler for keeping said FPA at a desired operating temperature; and,
    an evacuated dewar for isolating said FPA and said cooler from ambient conditions.

* * * * *